United States Patent [19]

Wagensonner et al.

[11] 4,007,467
[45] Feb. 8, 1977

[54] EXPOSURE CONTROL CIRCUIT

[75] Inventors: Eduard Wagensonner; Kurt Borowski, both of Aschheim; Dieter Knauer, Munich, all of Germany

[73] Assignee: AGFA-Gevaert, A.G., Leverkusen, Germany

[22] Filed: July 15, 1975

[21] Appl. No.: 596,054

[30] Foreign Application Priority Data

July 20, 1974 Germany .......................... 2434995

[52] U.S. Cl. .............................. 354/51; 354/60 R; 354/60 A
[51] Int. Cl.[2] ......................................... G03B 7/08
[58] Field of Search .................. 354/23, 38, 48, 50, 354/51, 60 R, 60 A

[56] References Cited
UNITED STATES PATENTS

| | | | |
|---|---|---|---|
| 3,460,451 | 8/1969 | Stamp et al. | 354/51 |
| 3,711,721 | 1/1973 | Hausen | 354/51 X |
| 3,868,704 | 2/1975 | Yamada et al. | 354/51 X |
| 3,879,118 | 4/1975 | Kiyohara et al. | 354/51 X |
| 3,882,510 | 5/1975 | Dobusawa | 354/51 X |

*Primary Examiner*—Russell E. Adams, Jr.
*Attorney, Agent, or Firm*—Michael J. Striker

[57] ABSTRACT

A light-sensitive element is connected to a capacitor to vary the charging rate of the capacitor in accordance with the light falling on the light-sensitive element. The emitter-collector circuit of a switching transistor is connected in series with the light-sensitive element. The base of the transistor is pulsed by an astable multivibrator which furnishes a pulse sequence having a pulse repetition rate which exceeds the reciprocal of the smallest exposure time. The pulses in the pulse sequence have a pulse width determined by the selected one of a plurality of resistors. The selector switch inserting the selected one of the resistors into the astable multivibrator circuit is coupled to selector means which select one of a plurality of exposure factors as for example the aperture size. The electronic switch is conductive, permitting charging of the capacitor only during the pulse duration. The charging rate of the capacitor can therefore be adapted to the particular aperture size, film sensitivity, etc. without changing the capacitance of the capacitor or covering a portion of the light-sensitive element.

6 Claims, 2 Drawing Figures

EXPOSURE CONTROL CIRCUIT

BACKGROUND OF THE INVENTION

The present invention relates to photographic apparatus and, in a preferred embodiment, to photographic cameras having a light-sensitive element and a capacitor which together constitute a timing circuit. The timing circuit is connected to terminating means which generally include a bistable stage which, when in a first state causes an electromagnet to hold open the shutter and when in a second state causes the electromagnet to terminate the exposure.

In general, photographic cameras operate at different exposure factors. For example the sensitivity of different films differs. Each such sensitivity would herein be referred to as an exposure factor. Similarly, the aperture values change. Each such aperture value would herein also be referred to as an exposure factor. In known photographic apparatus the difference in exposure factors is taken into account by the extent in which the light-sensitive element is protected from light by, for example, a gray wedge or an auxiliary diaphragm. However this results in the difficulty in that the sensitivity of the light-sensitive element decreases when increasing portions thereof are covered. This results in an increase in its inertia and therefore in errors in the exposure time.

A further known method of changing the timing circuit in order to accommodate different exposure factors is to change the capacitance of the timing capacitor. This of course has the disadvantage that, for each exposure factor, a capacitor must be provided. However increasing the number of capacitors results in an increase of the size, weight and cost of the camera.

SUMMARY OF THE INVENTION

It is an object of the present invention to furnish an exposure control circuit which does not have the abovementioned disadvantages. In other words, different exposure factors are to be accommodated while avoiding a decrease in the sensitivity of the light-sensitive elements and without increasing the inertia thereof.

The present invention resides in photographic apparatus and constitutes an automatic exposure control circuit operative under a plurality of exposure factors. It comprises a light-sensitive element and a capacitor. It further comprises first circuit means connected to said light-sensitive element and said capacitor and responsive to a start signal for changing the voltage across said capacitor from a first to a second predetermined value at a rate varying as a function of the light falling on said light-sensitive element. The present invention further comprises second circuit means connected to said first circuit means for periodically interrupting the operation of the latter for a selected off-time interval corresponding to a selected one of said plurality of exposure factors. In this manner the rate of change of voltage across the capacitor varies also in dependence upon the selected exposure factor. The present invention further comprises terminating means connected to the capacitor for terminating the exposure when the voltage across the capacitor reaches said second predetermined value.

In a preferred embodiment of the present invention the second circuit means comprise an electronic switch having a first and second stable state and adapted to interrupt the operation of the first circuit means when in the first stable state. Pulse furnishing means are provided which furnish a pulse sequence to said electronic switch, each of the pulses in the pulse sequence switching said electronic switch to said second state. The electronic switch is in the first state in the absence of said pulses. Further provided are means for changing the pulse width of said pulses in the pulse sequence to correspond to the selected exposure factor.

In a preferred embodiment of the present invention the pulse furnishing means comprise an astable multivibrator, while the means for changing the pulse width comprise a selector switch and a plurality of resistors each insertable into the astable multivibrator circuit by the selector switch in dependence upon the position thereof. The selector switch is coupled to the exposure factor selector that is, for example, the selector ring which selects the aperture.

It is seen that the actual charging time of the capacitor, that is the exposure time, will vary in accordance with the pulse width and specifically will decrease for increasing pulse widths and increase for decreasing pulse widths.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
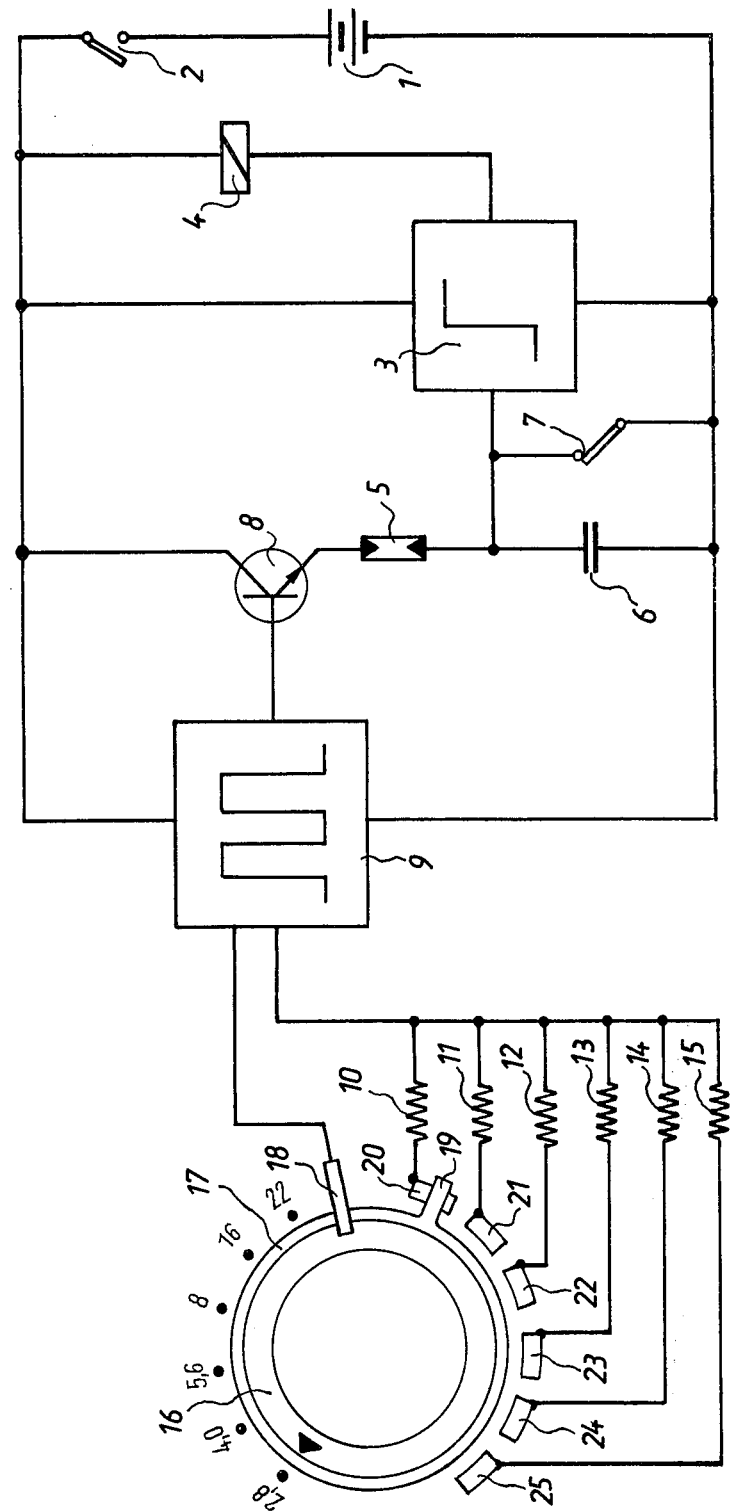
FIG. 1 is a schematic circuit diagram of a preferred embodiment of the present invention.

A preferred embodiment of the present invention will now be described with reference to the drawing.

In FIG. 1, reference numeral 1 denotes a battery which may be connected to the remainder of a circuit through a switch 2. A bistable stage 3 together with an electromagnet connected to its output together constitute terminating means for terminating the exposure. Specifically, electromagnet 4 is coupled to the shutter of the camera, which is not shown. The input of the bistable stage 3 is connected to a timing circuit including a light-sensitive element 5 and a capacitor 6. Connected in parallel with capacitor 6 is a start switch 7. The emitter-collector circuit of a transistor 8 is connected in series to the light-sensitive element 5. The base of transistor 8 is connected to the output of pulse furnishing means, namely, in a preferred embodiment, an astable multivibrator 9. Astable multivibrator circuits are well known and comprise at least two transistors. The pulse width and the time between the trailing edge of one pulse and the leading edge of the next-subsequent pulse are determined by the capacitance of a capacitor connected between the collector of the first transistor and the base of the second transistor as well as the resistance value of the resistor which is connected from the base of one of the transistors to the voltage source. The keying ratio is herein defined as the ratio of the pulse width to the period of the pulse sequence furnished by the astable multivibrator. The period of the pulse sequence is of course the time between the leading edge of one pulse and the leading edge of the next-subsequent pulse. This keying ratio may be varied by inserting into astable multivibrator circuit 9 one of the resistors 10–15. In accordance with FIG. 1, resistor 10 is associated with $f$-stop 2.8, resistor 11 with $f$-stop 2.0, resistor 12 with $f$-stop 5.6, resistor 13 with $f$-stop 8, resistor 14 with $f$-stop 16 and resistor 15 with $f$-stop 22.

Figure 2:
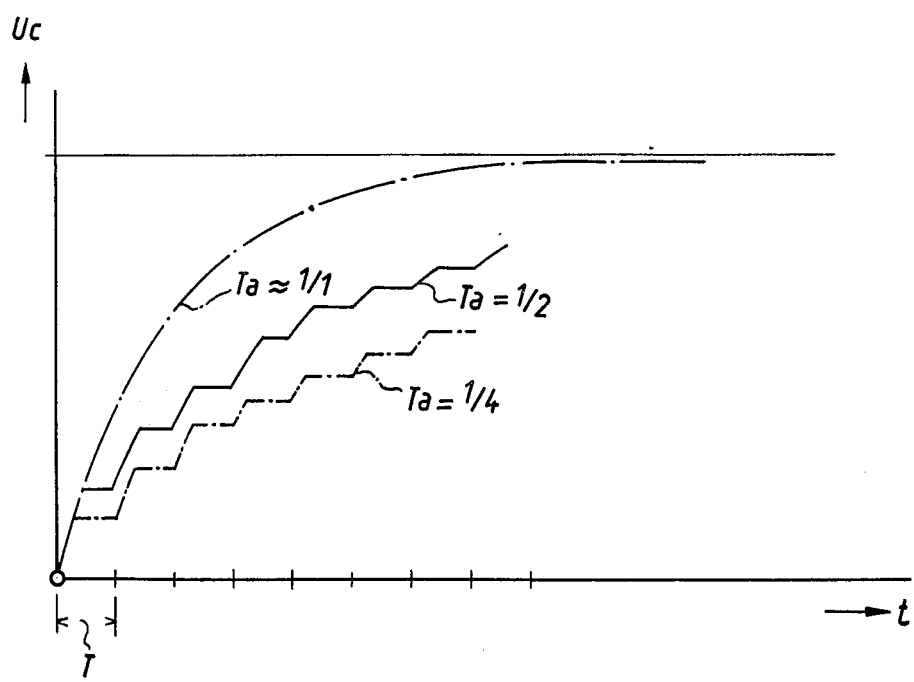
FIG. 2 is a voltage-time diagram for the capacitor of FIG. 1.

An aperture selecting ring is denoted by reference numeral 16 and includes a contact ring 17 cooperating with a first contact 18. Ring 17 is further electrically connected with a projection 19 which cooperates with contact segments 20, 21, 22, 23, 24 and 25. Contact ring 17 and projection 19 allow contact 18 to be connected through one of segments 20–25 to the corresponding one of resistors 10–15. The resistance values of the individual resistors are so related to each other that, starting for example with an $f$-stop of 2.8 which would result in the shortest exposure time for a given intensity of illumination, selection of increasing $f$-stop values would result in a corresponding lengthening of the exposure time. Thus the keying ratio for $f$-stop 2.8 would be only slightly smaller than 1.0, that is switch 8 will be conductive almost throughout the whole time since the pulse width would be essentially equal to the pulse period. The keying ratio will then decrease for increasing $f$-stop values. This is schematically indicated in FIG. 2 which shows the voltage variation across capacitor 6 as a function of time. It will be noted that the period T is the pulse period. For $T_a$ approximately equal to 1/1 (i.e. for a keying ratio of approximately 1) the curve will be the standard charging curve for a capacitor. When the keying ratio $T_a$ is equal to one-half, that is when the pulse width is half of the pulse period, the second curve in FIG. 2 will result. The third curve represents a keying ratio of one-quarter, that is the pulse width is one-quarter of the total pulse period. For the charging circuit control shown in FIG. 1, the start signal is furnished by opening of switch 7 which of course occurs at the beginning of the exposure time. The first predetermined value of the voltage across capacitor 6, that is, the value at the start of the exposure time, would be zero in the embodiment shown in FIG. 1 because of the short-circuiting effect of switch 7. The second predetermined value of voltage across capacitor 6, that is the value at the end of the exposure time would of course be the threshold voltage for stage 3, namely the voltage required to switch bistable stage 3 from the first to the second stable state.

It should further be noted that the pulse period must be sufficiently short so that a sufficiently accurate control of the exposure time takes place even for the shortest selected exposure time. Thus the pulse repetition frequency should be chosen to be greater than the reciprocable value of the shortest exposure time by a factor of at least 10.

The circuit shown in FIG. 1 shows a timing circuit using the charging characteristic of a capacitor to determine the exposure time. Similar control can of course be exercised on the discharge circuit of a capacitor when the camera is adapted for the type of operation wherein the capacitor is fully charged at the beginning of the exposure time and discharges to the second predetermined value ending the exposure time. The circuit would be essentially the same except that light-sensitive element 7 and transistor 8 would be connected in the discharge circuit of capacitor 6 while switch 7 would be eliminated and replaced by a switch adapted to disconnect the capacitor from the power supply during the exposure time. The discharge of the capacitor could be initiated either by closing a switch completing the discharge circuit or by enabling astable multivibrator 9.

While the invention has been illustrated and described as embodied in utilizing particular pulse furnishing means and capacitive-type timing circuits, it is not intended to be limited to the details shown, since various modifications and circuit changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. In a camera having a automatic exposure control circuit operative under a plurality of exposure factors, comprising in combination, a light-sensitive element; a capacitor; first circuit means connected to said capacitor and responsive to a start signal for changing the voltage across said capacitor from a first to a second predetermined value at a rate varying as a function of light falling on said light-sensitive element; means for furnishing said start signal at the start of the exposure time; second circuit means connected to said first circuit means for periodically interrupting the operation of the latter for a selected off-time interval corresponding to the selected one of said plurality of exposure factor, whereby the rate of change of voltage across said capacitor varies also in dependence upon said selected one of said exposure factors, said second circuit means comprise an electronic switch having a first and second stable state connected to said first circuit means for interrupting the operation thereof when in said first stable state, and pulse furnishing means connected to said electronic switch means for applying a sequence of pulses, each for switching said electronic switch means to said first stable state, to said electronic switch means, and means for changing the pulse width of the pulses in said pulse sequence to correspond to said selected one of said plurality of exposure factors; and terminating means connected to said capacitor for terminating the exposure when the voltage across said capacitor has said second predetermined value.

2. Photographic apparatus as set forth in claim 1, wherein each of said plurality of exposure factors is a film sensitivity.

3. Photographic apparatus as set forth in claim 1, wherein each of said plurality of exposure factors is an aperture size.

4. Photographic apparatus as set forth in claim 1, wherein the exposure time is variable from a predetermined minimum to a predetermined maximum exposure time; and wherein the time interval between sequential pulses in said pulse sequence is substantially shorter than said minimum exposure time.

5. Photographic apparatus as set forth in claim 4, wherein said pulse furnishing means comprise an astable multivibrator.

6. Photographic apparatus as set forth in claim 1, wherein said apparatus further comprises exposure factor selecting means for selecting one of said plurality of exposure factors; and wherein said means for changing the pulse width of said pulses in said sequence of pulses comprises a plurality of impedance elements, each for determining a different one of said pulse widths when connected to said pulse furnishing means, and impedance selector means, mechanically coupled to said exposure factor selecting means for movement therewith, for connecting a corresponding one of said impedance elements to said pulse furnishing means upon selection of a given one of said exposure factors.

* * * * *